United States Patent
Bleacher

[19]

[11] Patent Number: 5,904,035
[45] Date of Patent: May 18, 1999

[54] HAY INVERTER

[76] Inventor: Randall L. Bleacher, 1206 B Breneman Rd., Conestoga, Pa. 17516

[21] Appl. No.: 09/082,673

[22] Filed: May 21, 1998

[51] Int. Cl.$^6$ .................................................. A01D 76/00
[52] U.S. Cl. .................................. 56/367; 56/365; 56/372
[58] Field of Search .............................. 56/365, 367, 380, 56/382, DIG. 21

[56] References Cited

U.S. PATENT DOCUMENTS

| | | | |
|---|---|---|---|
| 273,792 | 3/1883 | Adams | 24/102 PL |
| 2,761,270 | 9/1956 | Blaser et al. | 56/DIG. 21 |
| 3,702,052 | 11/1972 | Klassen | 56/370 |
| 3,884,022 | 5/1975 | Landolt | 56/370 |
| 4,403,468 | 9/1983 | Yoder | 56/370 |
| 4,738,092 | 4/1988 | Jennings | 56/370 |
| 4,748,803 | 6/1988 | MacMaster et al. | 56/372 |
| 4,768,333 | 9/1988 | Reber | 56/370 |
| 4,777,788 | 10/1988 | Laquerre | 56/376 |
| 4,793,125 | 12/1988 | Ehrhart et al. | 56/370 |
| 4,793,129 | 12/1988 | Ehrhart et al. | 56/370 |
| 4,809,490 | 3/1989 | Swanson | 56/370 |
| 5,203,154 | 4/1993 | Lesher et al. | 56/372 |
| 5,231,826 | 8/1993 | Jennings | 56/372 |
| 5,309,703 | 5/1994 | Brinton | 56/370 |
| 5,450,717 | 9/1995 | Delperdang et al. | 56/372 |
| 5,507,139 | 4/1996 | Delperdang et al. | 56/372 |
| 5,596,868 | 1/1997 | Gerbrandt | 56/365 |
| 5,743,075 | 4/1998 | Aron et al. | 56/372 |

*Primary Examiner*—Thomas B. Will
*Assistant Examiner*—Arpad Fabian Kovacs

[57] ABSTRACT

A hay inverter is provided including a wheeled frame connected to a tractor and a drive assembly. Also included is a pick up unit for picking up hay from a windrow. An auxiliary frame is pivotally coupled to a side edge of the wheeled frame. Next provided is a swing arm conveyor mounted on the auxiliary frame for dispensing hay received from the pick up unit.

15 Claims, 3 Drawing Sheets

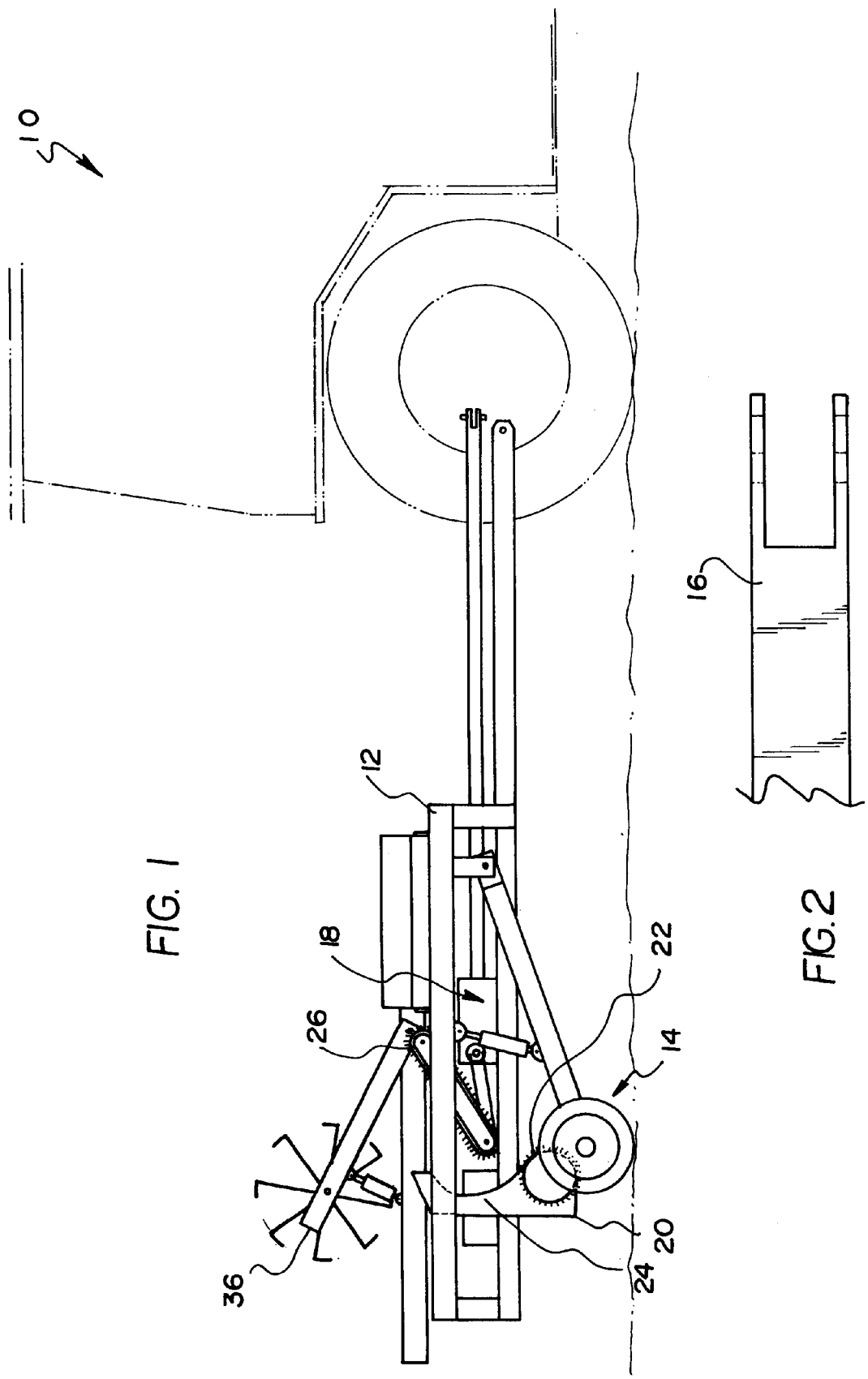

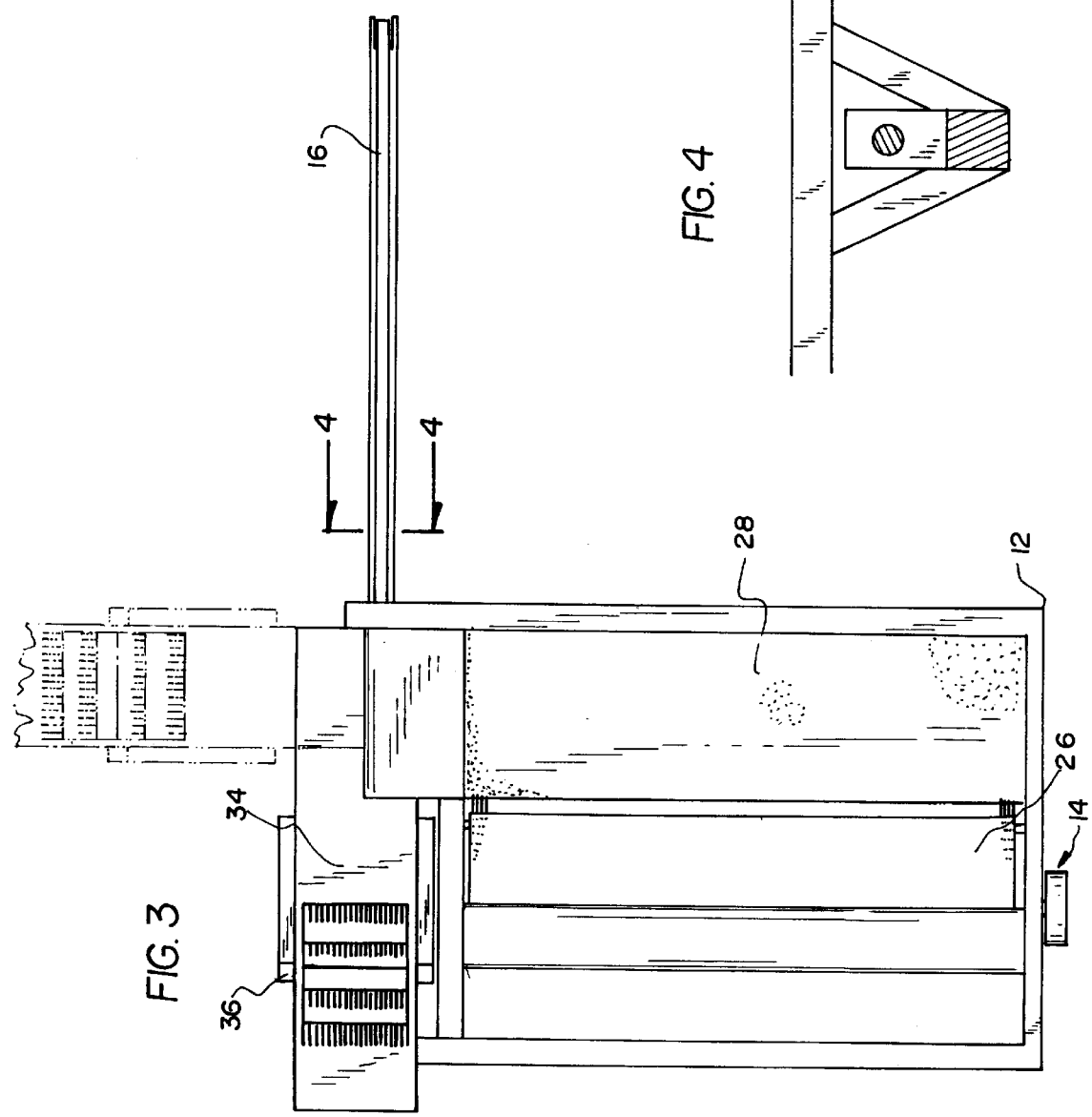

HAY INVERTER

BACKGROUND OF THE INVENTION

1. Field of the Invention

The present invention relates to windrow shifters and inverters and more particularly pertains to a new hay inverter for selectively dispensing inverted hay.

2. Description of the Prior Art

The use of windrow shifters and inverters is known in the prior art. More specifically, windrow shifters and inverters heretofore devised and utilized are known to consist basically of familiar, expected and obvious structural configurations, notwithstanding the myriad of designs encompassed by the crowded prior art which have been developed for the fulfillment of countless objectives and requirements.

Known prior art windrow shifters and inverters include U.S. Pat. No. 4,809,490; U.S. Pat. No. 4,738,092; U.S. Pat. No. 4,768,333; U.S. Pat. No. 4,777,788; U.S. Pat. No. Des. 273,792; and U.S. Pat. No. 5,175,987.

In these respects, the hay inverter according to the present invention substantially departs from the conventional concepts and designs of the prior art, and in so doing provides an apparatus primarily developed for the purpose of selectively dispensing inverted hay.

SUMMARY OF THE INVENTION

In view of the foregoing disadvantages inherent in the known types of windrow shifters and inverters now present in the prior art, the present invention provides a new hay inverter construction wherein the same can be utilized for selectively dispensing inverted hay.

The general purpose of the present invention, which will be described subsequently in greater detail, is to provide a new hay inverter apparatus and method which has many of the advantages of the windrow shifters and inverters mentioned heretofore and many novel features that result in a new hay inverter which is not anticipated, rendered obvious, suggested, or even implied by any of the prior art windrow shifters and inverters, either alone or in any combination thereof.

To attain this, the present invention generally comprises a frame having a generally rectangular configuration with a wheel assembly. Such wheel assembly includes an axle coupled therebelow. Further, a pair of wheels are rotatably coupled at opposite ends of the axle. The frame further includes a pulling post extending forwardly with a pair of spaced and apertured plates integrally coupled to an end thereof. Such apertured plates define a tongue for coupling with a conventional tractor. As shown in FIG. 3, the pulling post is connected to the frame adjacent to a first side edge thereof. Next provided is a drive assembly including a power take off(PTO) shaft. The PTO shaft has a first end rotatably coupled to and driven by the tractor. The power take off shaft extends rearwardly and in communication with the frame. FIG. 1 best shows a pick up unit including a tined cylinder rotatably coupled to the frame above and to the rear of the wheel assembly in parallel therewith. The tined cylinder has a length equal to that of the axle of the wheel assembly. The pick up unit further includes a backing mounted to the frame to the rear of the tined cylinder with a similar length. As shown in FIG. 1, the backing includes a vertically oriented planar lower extent and a forwardly extending arcuate upper extent. By this structure, upon the rotation of the tined cylinder by the drive assembly, hay from a windrow is picked up and directed upwardly along the backing and further directed forward. With reference now to both FIGS. 1 & 3, an elevation conveyer is shown to have a width equal to that of the backing of the pick up unit and a length less than ¼ that of the frame. The elevation conveyer is mounted to the frame and disposed about an angled upwardly extending plane situated in front of the arcuate extent of the backing of the pick up unit. In operation, the elevation conveyer is connected to the drive assembly and adapted to carry hay received from the pick up unit forwardly and upwardly. Mounted on the frame in front of the elevation conveyer is a lateral conveyer. This lateral conveyer has a width equal to the length of the elevation conveyor and a length equal to the width thereof. It should be noted that in the present context, a length of the conveyors are measured along the direction of travel of a belt associated therewith. The lateral conveyor is connected to the drive assembly. During use, the lateral conveyor moves hay is received from the elevation conveyor to the first side edge of the frame. Also included is an auxiliary frame having a pair of spaced parallel bars fixed with respect to each other. An L-shaped support is coupled to a bottom of such parallel bars. A bottom inboard end of the L-shaped support is in turn pivotally coupled to the first side edge of the frame. In use, the auxiliary frame is selectively rotatable within a horizontal plane. Coupled between the parallel bars of the auxiliary frame is a swing arm conveyor which has a length equal to that of the frame and a width about equal to that of the lateral conveyor. The swing arm conveyor is adapted for receiving hay from the lateral conveyor at an inboard end thereof. The swing arm then transports such hay to an outboard end thereof for dispensing on a recipient surface. As shown in FIG. 3, the outboard end is pivotable within a range of 90 degrees. Finally, a hay aggravator is provided including a cylinder rotatably coupled to ends of a pair of arms. Such arms are in turn hingably coupled to a central extent of the auxiliary frame above the swing arm conveyor. As such, the cylinder of the hay aggravator may be selectively elevated with respect to the swing arm conveyor and further rotatable. This allows hay to pass thereunder for aeration purposes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new hay inverter apparatus and method which has many of the advantages of the windrow shifters and inverters mentioned heretofore and many novel features that result in a new hay inverter which is not anticipated, rendered obvious, suggested, or even implied by any of the prior art windrow shifters and inverters, either alone or in any combination thereof.

It is another object of the present invention to provide a new hay inverter which may be easily and efficiently manufactured and marketed.

It is a further object of the present invention to provide a new hay inverter which is of a durable and reliable construction.

An even further object of the present invention is to provide a new hay inverter which is susceptible of a low cost of manufacture with regard to both materials and labor, and which accordingly is then susceptible of low prices of sale to the consuming public, thereby making such hay inverter economically available to the buying public.

Still yet another object of the present invention is to provide a new hay inverter which provides in the apparatuses and methods of the prior art some of the advantages thereof, while simultaneously overcoming some of the disadvantages normally associated therewith.

Still another object of the present invention is to provide a new hay inverter for selectively dispensing inverted hay.

Even still another object of the present invention is to provide a new hay inverter that includes a wheeled frame connected to a tractor and a drive assembly. Also included is a pick up unit for picking up hay from a windrow. An auxiliary frame is pivotally coupled to a side edge of the wheeled frame. Next provided is a swing arm conveyor mounted on the auxiliary frame for dispensing hay received from the pick up unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new hay inverter according to the present invention.

FIG. 2 is a top view of the tongue of the present invention.

FIG. 3 is a top view of the present invention.

FIG. 4 is a cross-sectional view of the present invention taken along line 4—4 shown in FIG. 3.

DESCRIPTION OF THE PREFERRED EMBODIMENT

Figure 5:
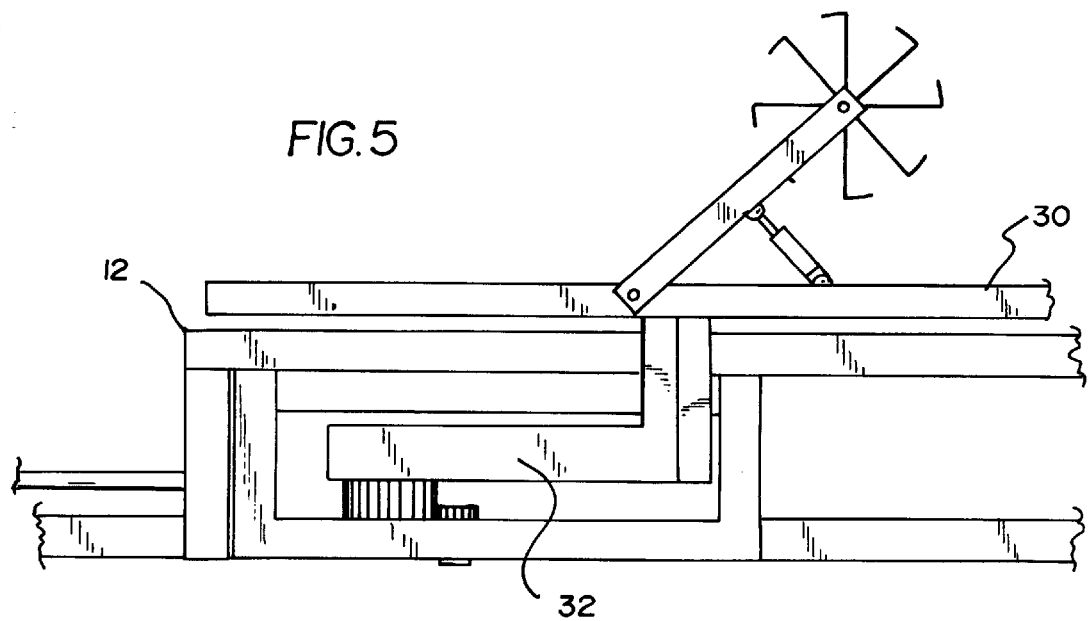
FIG. 5 is a side view of the auxiliary frame and swing arm conveyor of the present invention.
Figure 6:
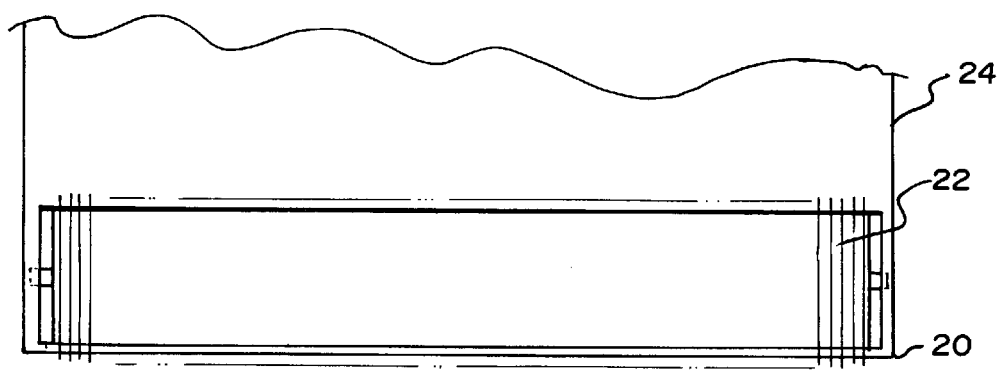
FIG. 6 is a front view of the pick up unit of the present invention.

With reference now to the drawings, and in particular to FIGS. 1 through 6 thereof, a new hay inverter embodying the principles and concepts of the present invention and generally designated by the reference numeral 10 will be described.

The present invention, designated as numeral 10, includes a frame 12 having a generally rectangular configuration with a wheel assembly 14. Such wheel assembly includes an axle coupled below the frame. Further, a pair of wheels are rotatably coupled at opposite ends of the axle. In the preferred embodiment, the frame is selectively elevatable by way of a pair of hydraulic arms coupled to the axle. Note FIG. 1.

The frame further includes a pulling post 16 extending forwardly with a pair of spaced and apertured plates integrally coupled to an end thereof. Such apertured plates define a tongue, as shown in detail in FIG. 2, for coupling with a conventional tractor. As shown in FIG. 3, the pulling post is connected to the frame adjacent to a first side edge thereof.

Next provided is a drive assembly 18 including a power take off(PTO) shaft. The PTO shaft has a first end rotatably coupled to and driven by the tractor. The power take off shaft extends rearwardly and in communication with the frame. As shown in FIG. 1, the shaft terminates in a drive box which has various pulley mechanisms associated therewith for purposes that will become apparent hereinafter.

FIG. 1 best shows a pick up unit 20 including a tined cylinder 22 rotatably coupled to the frame above and to the rear of the wheel assembly in parallel therewith. It should be understood that the tined cylinder may be selectively elevated by way of the hydraulic arms of the wheel assembly. The tined cylinder has a length equal to that of the axle of the wheel assembly. To afford rotation of the tined cylinder of the pick up unit, the same is preferably connected to one of the pulleys of the drive box by way of a belt or the like.

The pick up unit further includes a backing 24 mounted to the frame to the rear of the tined cylinder with a similar length. As shown in FIG. 1, the backing includes a vertically oriented planar lower extent and a forwardly extending arcuate upper extent. By this structure, upon the rotation of the tined cylinder by the drive assembly, hay from a windrow is picked up and directed upwardly along the backing and further directed forward. In various alternate embodiments, conventional pick up units may be utilized in lieu of that presently described.

With reference now to both FIGS. 1 & 3, a tined elevation conveyer 26 is shown to have a width equal to that of the backing of the pick up unit and a length less than ¼ that of the frame. The elevation conveyer is mounted to the frame and disposed about an angled upwardly extending plane situated in front of the arcuate extent of the backing of the pick up unit. In operation, the elevation conveyer is connected to the drive assembly by way of a belt, as shown in FIG. 1. As such, the elevation conveyer is adapted to carry hay received from the pick up unit forwardly and upwardly.

Mounted on the frame in front of the elevation conveyor is a lateral conveyer 28. This lateral conveyor has a width equal to the length of the elevation conveyor and a length equal to the width thereof. It should be noted that in the present context, a length of the conveyors is measured along the direction of travel of a belt associated therewith. The lateral conveyor relies on a hydraulic motor for motion. During use, the lateral conveyor moves hay that is received from the elevation conveyor to the first side edge of the frame.

Also included is an auxiliary frame 30 having a pair of spaced parallel bars fixed with respect to each other. An L-shaped support 32 is coupled to a bottom of such parallel bars. A bottom inboard end of the L-shaped support is in turn pivotally coupled to the first side edge of the frame. In use, the auxiliary frame is selectively rotatable within a horizontal plane by way of a hydraulic driven gear, as shown in FIG. 5.

Coupled between the parallel bars of the auxiliary frame is a swing arm conveyor 34 which has a length equal to that of the frame and a width about equal to that of the lateral conveyor. The swing arm conveyor is adapted for receiving hay from the lateral conveyor at an inboard end thereof. The swing arm then transports such hay to an outboard end thereof for dispensing on a recipient surface. As shown in FIG. 3, the outboard end is pivotable within a range of 90 degrees. It should be noted that the outboard end may thus be pivoted between a rearwardly extended position and a laterally extending position.

Finally, a hay aggravator 36 is provided including a rake rotatably coupled to ends of a pair of arms. Such arms are in turn hingably coupled to a central extent of the auxiliary frame above the swing arm conveyor. As such, the rake of the hay aggravator may be selectively elevated with respect to the swing arm conveyor and further selectively rotatable by way of a hydraulic motor. This allows hay to pass thereunder for aeration purposes.

During use, each of the conveyors may be coincidentally actuated from within the tractor. Further, the pick up unit may be raised, lowered, and activated independent of the conveyors. A user within the tractor may also selectively pivot and fix the swing arm conveyor in any desired orientation within its range via hydraulic control mechanisms. Finally, the rake of the aggravator may be selectively raised, lowered and further rotated during use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hay inverter comprising, in combination:
 a frame having a generally rectangular configuration with a wheel assembly including an axle coupled therebelow and a pair of wheels rotatably coupled at opposite ends of the axle, the frame further including a pulling post extending forwardly with a pair of spaced and apertured plates integrally coupled to an end thereof for coupling with a conventional tractor, wherein the pulling post is connected to the frame adjacent to a first side edge thereof;
 a drive assembly including a power take off shaft having a first end rotatably coupled to and driven by the tractor, the power take off shaft extending rearwardly and in communication with the frame;
 a pick up unit including a tined cylinder rotatably coupled to the frame above and to the rear of the wheel assembly in parallel therewith, the tined cylinder having a length equal to that of the axle of the wheel assembly, the pick up unit further including a backing mounted to the frame to the rear of the tined cylinder with a similar length, the backing including a vertically oriented planar lower extent and a forwardly extending arcuate upper extent, whereby upon the rotation of the tined cylinder by the drive assembly, hay from a windrow is picked up and directed upwardly along the backing and further directed forward;
 an elevation conveyer having a width equal to that of the backing of the pick up unit and a length less than ¼ that of the frame, the elevation conveyer disposed about an angled upwardly extending plane situated in front of the arcuate extent of the backing of the pick up unit, the elevation conveyer being connected to the drive assembly and adapted to carry hay received from the pick up unit forwardly and upwardly;
 a lateral conveyer having a width equal to the length of the elevation conveyor and a length equal to the width thereof, the lateral conveyor mounted to the frame in front of the elevation conveyor and connected to the drive assembly, whereby the lateral conveyor moves hay received from the elevation conveyor to the first side edge of the frame;
 an auxiliary frame including a pair of spaced parallel bars fixed with respect to each other and having an L-shaped support coupled to a bottom thereof, a bottom inboard end of the L-shaped support pivotally coupled to the first side edge of the frame and selectively rotatable within a horizontal plane;
 a swing arm conveyor mounted on the auxiliary frame and having a length equal to that of the frame and a width about equal to that of the lateral conveyor, the swing arm conveyor is adapted for receiving hay from the lateral conveyor at an inboard end thereof and transporting the same to an outboard end thereof for dispensing on a recipient surface, wherein the outboard end is pivotable within a horizontal plane for a range of 90 degrees; and
 a hay aggravator including a rake means rotatably coupled to ends of a pair of arms which are in turn hingably coupled to a central extent of the auxiliary frame above the swing arm conveyor, whereby the hay aggravator may be selectively elevated with respect to the swing arm conveyor and further rotatable for allowing hay to pass thereunder for aeration purposes.

2. A hay inverter comprising:
 a wheeled frame connected to a tractor;
 a drive assembly;
 a pick up unit for picking up hay from a windrow;
 an auxiliary frame pivotally coupled to a side edge of the wheeled frame;

a swing arm conveyor mounted on the auxiliary frame for dispensing hay received from the pick up unit; and a hay aggravator mounted on the swing arm conveyor.

3. A hay inverter as set forth in claim 2 wherein hay is received from the pick up unit by way of an elevation conveyor.

4. A hay inverter as set forth in claim 2 wherein hay is received from the pick up unit by way of a lateral conveyor.

5. A hay inverter as set forth in claim 2 wherein the hay aggravator includes a rake means rotatably coupled to ends of at least one arm which is in turn hingably coupled to the auxiliary frame above the swing arm conveyor.

6. A hay inverter as set forth in claim 2 wherein a pulling post of the wheeled frame that is used for connecting the wheeled frame to the tractor resides along a side edge of the wheeled frame.

7. A hay inverter as set forth in claim 2 wherein the auxiliary frame is pivotable only within a horizontal plane.

8. A hay inverter as set forth in claim 2 wherein the auxiliary frame is pivotable within a horizontal plane for a range of 90 degrees.

9. A hay inverter as set forth in claim 2 wherein the pick up unit includes a backing having a vertically oriented planar lower extent and an arcuate forwardly extending upper extent.

10. A hay inverter comprising:

a wheeled frame connected to a tractor;

a drive assembly;

a pick up unit for picking up hay from a windrow;

an auxiliary frame pivotally coupled to a side edge of the wheeled frame; and a swing arm conveyor mounted on the auxiliary frame for dispensing hay received from the pick up unit;

wherein the auxiliary frame is pivotable only within a horizontal plane.

11. A hay inverter as set forth in claim 10 wherein hay is received from the pick up unit by way of an elevation conveyor.

12. A hay inverter as set forth in claim 10 wherein hay is received from the pick up unit by way of a lateral conveyor.

13. A hay inverter as set forth in claim 10 wherein a pulling post of the wheeled frame that is used for connecting the wheeled frame to the tractor resides along a side edge of the wheeled frame.

14. A hay inverter as set forth in claim 10 wherein the auxiliary frame is pivotable within the horizontal plane for a range of 90 degrees.

15. A hay inverter as set forth in claim 10 wherein the pick up unit includes a backing having a vertically oriented planar lower extent and an arcuate forwardly extending upper extent.

* * * * *